United States Patent

Kume et al.

[11] Patent Number: 6,117,946
[45] Date of Patent: Sep. 12, 2000

[54] PROPYLENE BLOCK COPOLYMER

[75] Inventors: Takanori Kume, Ichikawa; Eisuke Shiratani, Ichihara; Kazuki Wakamatsu, Sodegaura, all of Japan

[73] Assignee: Sumitomo Chemical Company, Limited, Osaka, Japan

[21] Appl. No.: 09/123,576

[22] Filed: Jul. 28, 1998

[30] Foreign Application Priority Data

Jul. 28, 1997 [JP] Japan ................................... 9-201557

[51] Int. Cl.$^7$ ....................................................... C08L 23/16
[52] U.S. Cl. ........................... 525/323; 525/240; 525/247; 525/322; 525/268
[58] Field of Search ..................................... 525/323, 240, 525/247, 322, 268

[56] References Cited

U.S. PATENT DOCUMENTS 5,654,372  8/1997  Sadatoshi et al. ....................... 523/323
5,780,168  7/1998  Satoh et al. .............................. 525/240

FOREIGN PATENT DOCUMENTS 56-084712A  7/1981  Japan.
08283491A  10/1996  Japan.

*Primary Examiner*—James J. Seidleck
*Assistant Examiner*—Olga Asinovsky
*Attorney, Agent, or Firm*—Birch, Stewart, Kolasch & Birch

[57] ABSTRACT

A propylene block copolymer having a specified composition and consisting of a xylene soluble portion at 20° C. in an amount of 5 wt % or more and a portion excluding the CXS portion, the melting temperature of the CXIS portion measured by a differential scanning caloriemeter being 130 to 155° C., wherein the difference in transparency in terms of haze between prior to and posterior to the 1-hour treatment at 110° C of a 150 $\mu$m thick film obtained by forming said copolymer into a film by extrusion is 8% or less.

According to the present invention, a block copolymer having a good transparency and improved impact resistance at a low temperature, and further exhibiting less bleeding at high-temperature heat treatment, can be provided.

4 Claims, No Drawings

PROPYLENE BLOCK COPOLYMER

BACKGROUND OF THE INVENTION

1. Field of the Invention

The present invention relates to a propylene block copolymer. More particularly, it relates to a propylene block copolymer excellent in transparency, impact resistance at a low temperature, and bleeding control effect at a heat treatment.

2. Description of the Related Arts

Polypropylene is excellent in heat resistance, rigidity and the like, and hence has been used widely in fields of a film, sheet, container and the like.

In recent years, a material having flexibility, transparency, impact resistance and heat resistance all together has been required. However, a propylene homopolymer is excellent in heat resistance, but it is inferior in flexibility, transparency and impact resistance at a low temperature. A random copolymer of propylene with another α-olefin is excellent in transparency, but has insufficient impact resistance at a low temperature which limits the use thereof.

As a method for imparting the impact resistance thereto, there have been made some attempts for improvement using a propylene block copolymer mainly.

As a block copolymer composed of a polypropylene portion (herein-after, abbreviated as P) and ethylene-propylene random copolymer portion (herein-after, abbreviated as EP), JP-A-06-093061 discloses a P-EP block copolymer obtained by producing a polypropylene portion mainly composed of propylene with a Ziegler-Natta catalyst, substantially in the absence of an inert solvent in the first step, and subsequently producing an EP copolymer portion in a vapor phase in the second step. The polymerization in the vapor phase gives a polymer superior in impact resistance at a low temperature as compared with a conventional polymer produced in a solution polymerization method, however, the transparency of the polymer produced in the vapor phase is insufficiently low.

There is also known a block copolymer composed of an EP copolymer portion and the other EP copolymer portion different in the composition. JP-A-56-084712 discloses a propylene block copolymer having a melt flow index of 0.01 to 0.3 g/10 minutes, and being composed of a portion A (EP copolymer portion obtained in the first step) having an ethylene content of less than 20 wt % and a portion B (EP copolymer portion obtained in the second step) having an ethylene content of 20 wt % or more. Concretely, the polymer prepared by a solution polymerization method in the working example, is disclosed, but it was unsatisfactory in transparency. Also, in the comparative example, it is disclosed that a polymer in which the ethylene concentration of the portion B is reduced to improve transparency, however, the impact strength is unsatisfactorily low.

In JP-A-08-283491, there is disclosed a composition obtained by blending a random copolymer of ethylene, propylene and α-olefin with a random copolymer of ethylene, propylene and α-olefin having different comonomer contents therefrom. However, in the case of blend, a homogeneous mixing as in the block copolymer can not be attained, the blend had an insufficient transparency.

The present inventors has studied in order to overcome the deficiencies of conventional block copolymers, and develop a propylene block copolymer with good transparency and improved impact resistance at a low temperature. As results, they proposed a method for producing a composition having transparency, impact resistance and the like all together, by producing an EP-EP type block copolymer with a specific composition substantially in the absence of an inert solvent.

However, the use of the specific EP—EP type block copolymer obtained by polymerization substantially in the absence of the solvent is unsatisfactory in the applications such as packing bag for medical care required to extremely reduce a change in transparency at the time of high-temperature heat treatment.

The change in transparency is caused mainly by a change in haze resulting from the bleeding mainly of a low molecular weight component by heat treatment. Accordingly, there has been required a resin composition whose bleeding at a high temperature is controlled.

It is noted that the block copolymer herein stated means the one obtained by sequentially conducting the polymerization of the first step, and the polymerization of the second step is not a true block copolymer, but is a kind of blend (composition).

SUMMARY OF THE INVENTION

An object of the present invention is to provide a propylene block copolymer which has a good transparency, and improved impact resistance at a low temperature, and further whose bleeding at high-temperature heat-treatment thereof is reduced.

The present inventors intensively studied in order to overcome the drawbacks of the conventional block copolymers, as the results, found that a specific block copolymer obtained by polymerization substantially in the absence of an inert solvent can overcome the forgoing problems, and attained the present invention.

The present invention provides a propylene block copolymer consisting of a xylene soluble portion at 20° C. (herein-after, sometimes referred to as "CXS portion") in an amount of 5 wt % or more and a portion excluding the CXS portion (herein-after, sometimes referred to as "CXIS portion"), wherein:

the propylene block copolymer consists essentially of 40 to 85 wt % of a propylene-butene-1, or ethylene-propylene-butene-1 copolymer portion having an ethylene content of 3 wt % or less and a butene-1 content of 3 to 25 wt % produced by copolymerizing propylene, butene-1 and ethylene, or propylene and butene-1 substantially in the absence of an inert solvent in the presence of a Zieglar Natta catalyst in the first step as a component A, and 15 to 60 wt % of a propylene-butene-1, or ethylene-propylene-butene copolymer portion having an ethylene content of 17 wt % or less and a butene-1 content of 3 to 35 wt % produced by subsequently copolymerizing propylene, butene-1 and ethylene, or propylene and butene-1 in the presence of the polymer containing the catalyst, produced in the first step in vapor phase in the second step as a component B, wherein the intrinsic viscosity ($[\eta]B$) of the component B is in the range of 1.5 to 5 dl/g and the ratio of the intrinsic viscosity ($[\eta]B$) of the component B to the intrinsic viscosity ($[\eta]A$) of the component A ($[\eta]B/[\eta]A$) is 0.5 to 1.8;

the melting temperature (herein-after, sometimes referred to as "Tm") of the CXIS portion measured by a differential scanning caloriemeter (herein-after, sometimes referred to as "DSC") is 130 to 155° C.; and the difference in transparency in terms of haze between prior to and posterior to the 1-hour treatment at 110° C. of a 150-$\mu$m thick film of the propylene block copolymer formed by extrusion is 8% or less.

DETAILED DESCRIPTION OF THE INVENTION

The propylene block copolymer of the present invention consists of a CXS portion in an amount of 5 wt % or more and a CXIS portion, the melting temperature (Tm) of the CXIS portion measured by a DSC being 130 to 155° C., wherein the difference in transparency in terms of haze between prior to and posterior to the 1-hour treatment at 110° C. of a 150 μm thick film obtained by extrusion-forming said copolymer into a film is 8% or less.

When the CXS portion content is less than 5 wt %, the rigidity of the block copolymer is too high and the impact resistance is insufficient, and hence it is undesirable. From a viewpoint of heat resistance, the Tm of the CXIS portion measured by a DSC is required to be 130° C. or more, while from viewpoints of revelation of transparency and control of rigidity, it is required to be 155° C. or less.

It is necessary that the block copolymer of the present invention has a structure giving a difference of transparency in terms of haze between prior to and posterior to the 1-hour treatment at 110° C. of a 150-μm thick film formed by extrusion-forming for the purpose of controlling the bleeding of the low molecular weight component contained the block copolymer and reduction of the transparency due to a structural change of the film on the heating, is 8% or less.

As a method for producing the propylene block copolymer of the present invention, there is illustrated the following method: a method comprising copolymerizing propylene, butene-1 and optional ethylene with a Ziegler-Natta catalyst substantially in the absence of an inert solvent in the first step to produce a portion of an ethylene-propylene-butene-1 copolymer or propylene-butene-1 copolymer (component A) having an ethylene content of 3 wt % or less and a butene-1 content of 3 to 25 wt %, the balance being propylene, wherein the polymerization amount in the first step is preferably 40 to 85 wt % based on the total polymerization amount, and subsequently copolymerizing propylene, butene-1 and optional ethylene in the presence of the polymer containing the catalyst produced in the first step in vapor phase in the second step to produce a portion of an ethylene-propylene-butene-1 copolymer or propylene-butene-1 copolymer (component B) having an ethylene content of 17 wt % or less and a butene-1 content of 3 to 35 wt %, the balance being propylene, wherein the polymerization amount in the second step is preferably 15 to 60 wt % based on the total polymerization amount.

In the producing method, when the amount of the component B is less than 15 wt % based on the total weight of the A component and B component, the impact resistance at a low temperature is insufficient. When the amount of component B is more than 60 wt % based on the total weight of the A component and B component, the heat resistance becomes poor. Especially, when used in film applications, it is more preferable from a viewpoint of processability that the amount of the component B is 17 to 35 wt % based on the total weight of the A component and B component.

The copolymer portion polymerized in the first step (component A) has preferably an ethylene content of 3 wt % or less and a butene-1 content of 3 to 25 wt %. When the ethylene content exceeds 3 wt %, the bleeding controlling effect at a high-temperature heat treatment is inferior. When the butene-1 content is less than 3 wt %, transparency is not be expressed, while a butene-1 content exceeding 25 wt % reduces the heat resistance. Especially, the butene-1 content is more preferably 6 to 20 wt % from a viewpoint of transparency and heat resistance.

The ethylene and the butene-1 contents of the copolymer portion polymerized in the second step (component B) are preferably 17 wt % or less, and in the range of 3 to 35 wt %, respectively. When the ethylene content exceeds 17 wt %, the bleeding-controlling effect at a high-temperature heat treatment cannot be expected. Especially, the ethylene content is more preferably 8 wt % or less in view of transparency. When the butene-1 content is less than 3 wt %, the transparency is reduced, while a butene-1 content exceeding 35 wt % induces the bleeding.

In the propylene block copolymer of the present invention, it is preferable from a viewpoint of transparency that the intrinsic viscosity ($[\eta]B$) of the component B is in the range of 2.0 to 5.0 dl/g, and the ratio ($[\eta]B/[\eta]A$) of the intrinsic viscosity ($[\eta]B$) of the component B to the intrinsic viscosity ($[\eta]A$) of the component A is 0.5 to 1.8. When the $[\eta]B$ is less than 2.0 dl/g, a component of a low molecular weight increases in amount, it results in an increase in bleeding. When the $[\eta]B$ exceeds 5.0 dl/g, the fluidity of the block copolymer is reduced, it results in a reduction in processability. Especially, the intrinsic viscosity ($[\eta]B$) of the component B of the ethylene-propylene copolymer is more preferably 2.5 to 4.0 dl/g from a viewpoint of the balance of controlling of the low molecular weight component with processability. When the $[\eta]B/[\eta]A$ ratio exceeds 1.8, or is less than 0.5, the compatibility between the components A and B is reduced and the transparency sometimes becomes poor. Especially, the $[\eta]B/[\eta]A$ ratio is more preferably 0.8 to 1.5 from a viewpoint of transparency.

In addition, it is preferable for expressing transparency from a viewpoint of the compatibility between the components A and B that the propylene block copolymer of the present invention satisfies the following equations:

$$3 \leq CBE-CAE \leq 15, \text{ and } CAB-5 \leq CBB \leq CAB+10$$

wherein CBE (wt %) and CBB (wt %) represent the ethylene content and the butene-1 content of the component B, respectively, and CAE (wt %) and CAB (wt %) represent the ethylene content and the butene-1 content of the component A, respectively.

In the propylene block copolymer of the present invention, it is preferable in terms of controlling the amount of extraction with an organic solvent (e.g. hexane) that the amount of a component having a molecular weight of 26000 or less in the xylene soluble portion at 20° C. after melt-kneading of the propylene block copolymer, is 6 wt % or less based on the weight of the propylene block copolymer. Especially, when used as a material for food packaging, it is more preferable that the amount of the component having a molecular weight of 26000 or less in the xylene soluble portion at 20° C. is 3.5 wt % or less based on the weight of the propylene block copolymer.

The propylene block copolymer of the present invention can be produced with a Ziegler-Natta catalyst by a batch polymerization method in which the production of the components A and B is carried out in the same polymerization vessel, or by a continuous polymerization method in which the components A and B are continuously produced by the use of at least two polymerization vessels.

Concretely, for example, there can be used a Ziegler-Natta catalyst containing at least titanium, magnesium and halogen as essential components such as a catalyst system consisting of:

(a) a solid catalyst component containing a trivalent titanium compound obtained by reducing a titanium compound represented by the general formula $Ti(OR^1)_n X_{4-n}$ ($R^1$ represents a hydrocarbon having 1 to 20 carbon atoms, X represents a halogen atom, and n denotes a numeric of 0<n≦4.) and an optional ether compound with an organomagnesium compound in the presence of an organosilicon compound having a Si—O bond to obtain a solid product, and treating the solid product with an ester compound, and then a mixture of an ether compound and titanium tetrachloride;

(b) an organoaluminium compound; and (c) a silicon compound having an Si—OR$^2$ bond, (R$^2$ represents a hydrocarbon group having 1 to 20 carbon atoms). Furthermore, there can be used a Zieglar-Natta catalyst such as a catalyst consisting of:

(a) a hydrocarbyloxy group-containing solid catalyst component obtained by reducing a titanium compound represented by the general formula Ti(OR$^1$)$_n$X$_{4-n}$ (R$^1$ represents a hydrocarbon group having 1 to 20 carbon atoms, X represents a halogen atom, and n denotes a numeric of 0<n≦4.), with an orgonoaluminium compound represented by the general formula AlR$^2_m$Y$_{3-m}$ (R$^2$ represents a hydrocarbon having 1 to 20 carbon atoms, Y represents a halogen atom, and m denotes a numeric of 1≦m≦3.) to obtain a solid product containing a hydrocarbyloxy group insoluble in a hydrocarbon solvent, prepolymerization-treating with ethylene, and then heat-treating the resulting solid at a temperature of 80 to 100° C. in the presence of an ether compound and titanium tetrachloride in a hydrocarbon solvent in a slurry state; and (b) an organoaluminum compound.

In the polymerization, the amounts used of the components (a), (b) and (c) are as follows:

The molar ratio of Al atoms in the component (b)/Ti atoms in the component (a) is usually in the range of 1 to 2000, preferably in the range of 5 to 1500, and the molar ratio of the component (c)/Al atoms in the component (b) is usually in the range of 0.02 to 500, preferably in the range of 0.05 to 50.

Also, polymerization conditions are as follows:

The polymerization temperature is usually in the range of 20 to 150° C., preferably in the range of 50 to 95° C.; and the polymerization pressure is usually in the range of atmospheric pressure to 40 Kg/cm$^2$G, preferably in the range of 2 to 40 Kg/cm$^2$G. Under these conditions, in the first step, substantially in the absence of an inert solvent, propylene, butene-1 and optional ethylene are polymerized while supplying hydrogen for adjusting the molecular weight together with propylene, butene-1 and optional ethylene to produce a propylene-butene-1-(ethylene) copolymer portion (component A), and subsequently, in the second step, in vapor phase, propylene, butene-1 optional ethylene and hydrogen are supplied to produce the propylene-butene-1-(ethylene) copolymer portion (component B). Thus the propylene block copolymer of the present invention is produced.

With respect to the propylene block copolymer of the resent invention, it is possible to change the fluidity represented by, for example, melt flow rate by a known method in the presence of, or in the absence of a radical generating agent such as a diazo compound, organic peroxide at the time of melt-kneading. The radical generating agent preferably has a half-life at 130° C. of about 2.0 to about 10.0 hours, and concrete examples thereof include 2,5-dimethyl-2,5-di(tert-butylperoxy)hexane, 2,5-dimethyl-2,5-di(tert-butylperoxy)hexyne-3, dicumylperoxide, di-tert-butylperoxide, tert-butylcumylperoxide and the like. Among these, 2,5-dimethyl-2,5-di(tert-butylperoxy)hexane and 2,5-dimethyl-2,5-di(tert-butylperoxy)hexyne-3 are particularly preferred. Also, if required, it is possible to contain an oxidation inhibitor, ultraviolet absorber, antistatic agent, anti-fogging agent, nucleating agent or the like.

The propylene block copolymer of the present invention can be used alone, but can be used in mixture with a different resin composition as far as the object of the present invention is not damaged.

The propylene block copolymer of the present invention is suitable as a material for a film, sheet, or shaped articles such as containers or the like.

A film or sheet of the propylene block copolymer alone or at least one layer of the propylene block copolymer of multilayer with a different resin can be formed by a conventional inflation method, T-die method, calender method, or the like. In the use thereof, they also can be laminated as a layer of multilayer obtained by, conventionally adopted, an extrusion laminating process, a heat laminate process, a dry laminate process, or the like.

Also, the obtained film and sheet can be uniaxially or biaxially stretched by, for example, a roll stretching, tenter stretching or tubular stretching. They can be also subjected to a surface treatment such as, conventionally employed on an industrial scale, corona discharge treatment, flame treatment, plasma treatment, ozone treatment or the like.

As shaped articles, they can be used as a bottle obtained by a direct blow molding, biaxial orientation blow molding, or the like; a container obtained by vacuum forming, pressure forming, or the like; and a shaped article obtained by injection molding, or the like. The molded article can be used as it is or as at least one layer of multilayer construction with different resins.

They are especially suitable for a layer of a film for packing a retort-packed food from a viewpoint of flexibility, transparency, heat resistance and impact resistance at a low temperature, and for a material for a bag for medical liquid from a viewpoint of transparency, heat resistance and bleeding-control at a heat treatment.

EXAMPLES

The present invention is explained by way of examples, but not limited thereto. The measurements of the properties were carried out by the following methods.

(1) Contents of component A and component B (wt %)

The contents of component A (PA) and the component B (PB) were determined from the material balance of the components A and B at the time of polymerization.

(2) Intrinsic viscosity ([η])

Intrinsic viscosity was measured at 135° C. in tetralin using a Ubbelohde viscometer.

Intrinsic viscosities of the components A ([η]A) and B ([η]B)

From the intrinsic viscosity [η]A measured after the polymerization of the component A in the first step was finished, the intrinsic viscosity [η]AB measured after the polymerization in the second step was finished, and the contents of the component A (PA) and the component B (PB), the intrinsic viscosity [η]B of the component B was determined by the following equation:

$$[\eta]A \times PA/100 + [\eta]B \times PB/100 = [\eta]AB$$

(3) Contents of ethylene and butene-1

The measurement carried out according to a 13C-NMR method described on page 616 of "Polymer Handbook" (1995, published by Kinokuniya Company Ltd.).

The ethylene concentrations of the components A (EA) and B (EB)

From the ethylene concentration (EA) measured after the polymerization of the component A in the first step was finished, the ethylene concentration measured after the polymerization in the second step was finished (EAB), and the component A content (PA) and the component B content (PB), the ethylene concentration (EB) of the component B was determined by the following equation:

$$EA \times PA/100 + EB \times PB/100 = EAB.$$

Also for butene-1, the concentrations were determined according to the same method.

(4) Melt flow rate (MFR)

According to JIS K7210, the measurement was carried out by a method of condition-14.

(5) Xylene soluble portion at 20° C. (CXS)

Five g of a propylene block copolymer was completely dissolved in 500 ml of boiled xylene, after which the temperature was decreased to 20° C., and the resulting mixture was allowed to stand for 4 hours or longer. Thereafter, this was separated into a precipitate and a solution by filtration. Then, the filtrate was evaporated to dryness, and dried under reduced pressure at 70° C.

(6) Impact resistance

The impact strength of the film was measured using a Film Impact Tester manufactured by Toyo Seiki Co., Ltd. with a hemispherical head of a diameter of 15 mm at −10° C.

(7) Transparency (Haze)

It was measured according to JIS K7105.

(8) Bleeding

A film of 0.15 mm in thickness, obtained under the extrusion film-forming conditions of a resin temperature of 250° C., and a chilled roll temperature of 30° C., was allowed to stand in a 110° C. oven for 1 hour thereby carrying out a heat treatment. The difference in transparency between prior to and posterior to the treatment was taken as an index of bleeding. The transparency (haze) was measured according to JIS K7105.

(9) Low molecular weight component

By gel permeation chromatography (GPC), the component CXS was measured under the following conditions. Also, a calibration curve was made using a standard polystyrene.

Kind: 150CV type (manufactured by MILIPOREWATERS Co.)

Column: Shodex M/S 80 (manufactured by Showa Denko K.K.)

Measuring temperature: 145° C.

Solvent: o-dichlorobenzene

Sample concentration: 5 mg/8 ml

Using this molecular weight distribution, the content of the component with a molecular weight of 26000 or less was measured, and evaluated by the following standards. ○: The content is less than 2.6 wt % Δ: The content is within the range of 2.6 wt % to 6.0 wt % ×: The content is more than 6.0 wt %

(10) Melting temperature (Tm)

The melting temperature was measured using a differential scanning caloriemeter (DSC, manufactured by Perkin-Elmer limited).

After a sample of 10 mg was melt for 5 minutes at a temperature of 220° C. under a nitrogen atmosphere, the sample was cooled to 40° C. at a rate of 5° C./minute. Thereafter, the sample was heated at a rate of 5° C./minute, and the temperature at a maximum peak of thus obtained melting curve was determined as a melting temperature (Tm).

Example 1

[Synthesis of solid catalyst component]

A 200-L stainless steel reactor equipped with a stirrer was replaced with nitrogen. Thereafter, 80 L of hexane, 6.55 moles of titanium tetrabutoxide, 2.8 moles of diisobutyl phthalate, and 98.9 moles of tetraethoxysilane were charged therein to obtain a homogeneous solution. Then, 51 L of a diisobutyl ether solution having a butylmagnesium chloride concentration of 2.1 mole/L was gradually added dropwise over 5 hours while maintaining the temperature at 5° C. After the dropping was finished, the mixture was further stirred for 1 hour at room temperature, followed by solid-liquid separation at room temperature. Then, the resulting solid was washed three times with 70 L of toluene. Subsequently, toluene was added so that the slurry concentration became 0.2 Kg/L, after which 47.6 moles of diisobutyl phthalate was added thereto to effect a reaction at 95° C. for 30 minutes. After the reaction, the resulting mixture was subjected to solid-liquid separation, and the resulting solid was washed twice with toluene. Then, 3.13 moles of diisobutyl phthalate, 8.9 moles of butyl ether, and 2.74 moles of titanium tetrachloride were added to effect a reaction at 105° C. for 3 hours. After the reaction, at the same temperature, the solid-liquid separation was performed, and then, the resulting solid was washed twice with 90 L of toluene at the same temperature. Subsequently, the slurry concentration was adjusted to 0.4 Kg/L, after which 8.9 moles of butyl ether and 137 moles of titanium tetrachloride were added to effect a reaction at 105° C. for 1 hour. After the reaction, at the same temperature, the solid-liquid separation was performed, and then, the resulting solid was washed three times with 90 L of toluene at the same temperature. Thereafter, washing was further conducted with 70 L of hexane three times, followed by drying under reduced pressure to obtain 11.4 Kg of solid catalyst component. The resulting solid catalyst component contained 1.8 wt % of titanium atom, 20.1 wt % of magnesium atom, 8.4 wt % of phthalate, 0.3 wt % of ethoxy group, and 0.2 wt % of butoxy group, and had a good particle shape free from fine powder.

[Production of polymer]

(1) Pre-activation of solid catalyst component

A stainless steel autoclave equipped with a stirrer, with an inner volume of 3 L was sufficiently dehydrated and deaerated. 1.5 L of n-hexane, 37.5 millimoles of triethylaluminium, 37.5 millimolles of t-butyl-n-propyldimethoxysilane and 15 g of the above-described solid catalyst component were charged therein. While maintaining the temperature in the autoclave at 30° C. or less, 15 g of propylene was continuously supplied over about 30 minutes to perform pre-activation. Thereafter, the obtained solid catalyst slurry was transported to a stainless steel autoclave equipped with a stirrer, with an inner volume of 150 L to which 100 L of liquid butane was added to be conserved.

(2) Polymerization

Two fluidized-bed reactors each equipped with a stirrer, with an inner volume of 1 m³, made from stainless steel, were connected to each other. The copolymerization of propylene and butene-1 for producing the former part (component A) in the first reactor, and then the copolymerization of propylene, ethylene and butene-1 for producing the latter part (component B) in the second reactor were continuously carried out.

(i) Preparation of component (A) in the first reactor

Under conditions of a holdup amount of 60 kg at a polymerization temperature of 75° C. under a polymerization pressure of 1.8 Mpa, triethylaluminum of 70 mmol/hour, t-butyl-n-propyldimethoxysilane of 14 mmol/hour and the pre-activated solid catalyst component of 0.32 g/hour were continuously fed to the first reactor while propylene, butene-1 and hydrogen were fed thereto so as to maintain 0.3% by volume of hydrogen concentration and 15% by volume of butene-1 concentration in the vapor phase thereby copolymerizing propylene and butene-1 to obtain 11.5 kg/hour of a polymer. The polymer obtained was continuously transferred to the second reactor without deactivation of the catalyst. And, a part of the polymer was sampled and analyzed. As the result, the polymer had a butene-1 content of 14% by weight and an intrinsic viscosity [η]A measured in tetralin at 135° C. of 3.6 dl/g.

(ii) Preparation of component (B) in the second reactor

Under conditions of a holdup amount of 90 kg at a polymerization temperature of 75° C. under a polymerization pressure of 1.2 Mpa, in the presence of the polymer containing the catalyst transferred from the first reactor, propylene, butene-1, ethylene and hydrogen were continuously fed in the second reactor so as to maintain 0.3% by volume of hydrogen concentration, 18% by volume of butene-1 concentration and 8% by volume of ethylene concentration in the vapor phase thereby copolymerizing propylene, butene-1 and ethylene to obtain 17.2 kg/hour of a block copolymer. The block copolymer obtained had an ethylene content of 2.3% by weight, a butene-1 content of 14% by weight and an intrinsic viscosity [η]AB of 3.8 dl/g measured in tetralin at 135° C. The ethylene and butene-1 contents and intrinsic viscosity [η]B determined from analyzed values of the component A and the block copolymer, were 7% by weight, 14% by weight and 4.6 dl/g, respectively.

(3) Adjustment of MFR of the block copolymer 0.032 parts by weight of 2,5-dimethyl-2,5-di(tert-butylperoxy)hexane was added to 100 parts by weight of the obtained copolymer. After mixed with a Henschel mixer, the resulting mixture was extruded with a 40 mm φ extruder at 220° C. at a discharge rate of 10 kg/hour while melt-kneading thereby adjusting the MFR of 3.4 g/10 minutes.

The block copolymer shown in Table 1 was produced. The evaluation results are shown in Table 2. The transparency and impact resistance of a film obtained were good, and a film exhibited less change in transparency caused by a bleeding after high temperature heat treatment.

Example 2

The operation were repeated in the same manner as in Example 1 except that concentrations of ethylene, butene-1 and hydrogen were changed, thereby obtaining a block copolymer shown in Table 1, and the block copolymer was subjected to thermal decomposition similar to Example 1 to adjust the MFR as shown in Table 1. The evaluation results are shown in Table 2.

Comparative Example 1

A block copolymer shown in Table 1 was obtained with the same method as in example 1 except that concentrations of ethylene and hydrogen were changed and butene-1 was not used to obtain a block copolymers as shown in Table 1, and the block copolymer was subjected to thermal decomposition similar to Example 1 to adjust the MFR as shown in Table 1. The results were shown in Table 2. There was observed bleeding after high-temperature heat treatment.

TABLE 1

|  | Component A | | | Component B | | | | MFR | CXIS | |
| --- | --- | --- | --- | --- | --- | --- | --- | --- | --- | --- |
|  | [η]A dl/g | C2' wt % | C4' wt % | [η]B dl/g | C2' wt % | C4' wt % | Content wt % | g/10 min | CXS Wt % | Tm ° C. |
| Example 1 | 3.6 | 0 | 14 | 4.2 | 7 | 14 | 33 | 3.4 | 20.5 | 139 |
| Example 2 | 3.7 | 0 | 14 | 4.4 | 5 | 16 | 21 | 4.1 | 6.7 | 137 |
| Comparative Example 1 | 3.0 | 3.6 | 0 | 3.2 | 12 | 0 | 35 | 2.3 | 12.5 | 138 |

TABLE 2

|  | Film (30μ) | | Film (150μ) | Low Molecular |
| --- | --- | --- | --- | --- |
|  | Haze % | Impact −10° C. | Bleeding % | Weight Component |
| Example 1 | 0.5 | >100 | 3.3 | ○ |
| Example 2 | 0.4 | 60 | 0.8 | ○ |
| Comparative Example 1 | 0.7 | 24 | 10 | — |

The propylene block copolymer of the present invention has a good transparency and improved impact resistance at a low temperature, and further exhibits less bleeding at high-temperature heat treatment.

What is claimed is:

1. A propylene block copolymer consisting of a xylene soluble portion at 20° C. (CXS portion) in an amount of 5 wt % or more and a portion excluding the CXS portion (CXIS portion), wherein:

the propylene block copolymer consists essentially of 40 to 85 wt % of a propylene-butene-1, or ethylene-propylene-butene-1 copolymer portion having an ethylene content of 3 wt % or less and a butene-1 content of 6 to 20 wt % produced by copolymerizing propylene, butene-1 and ethylene, or propylene and butene-1 substantially in the absence of an inert solvent in the presence of a Zieglar Natta catalyst in the first step as a component A, and 15 to 60 wt % of a propylene-butene-1, or ethylene-propylene-butene-1 copolymer portion having an ethylene content of 17 wt % or less and a butene-1 content of 3 to 16 wt % produced by subsequently copolymerizing propylene, butene-1 and ethylene, or propylene and butene-1 in the presence of the polymer containing the catalyst, produced in the first step in vapor phase in the second step as a component B, wherein the intrinsic viscosity ({η}B) of the component B is in the range of 1.5 to 5 dl/g, and the ratio of the intrinsic viscosity ({η}A) of the component A ({η}B/{η}A) is 0.5 to 1.8;

the melting temperature of the CXIS portion is 130 to 155° C.; and the difference in transparency in terms of haze between prior to and posterior to the 1-hour treatment at 110° C. of a 150-μm thick film of the propylene block copolymer formed by extrusion is 8% or less, and wherein the propylene block copolymer satisfies the following equations:

$$3 \leq CBE - CAE \leq 15, \text{ and}$$

$$CAB - 5 \leq CBB \leq CAB + 10,$$

wherein CBE (wt %) and CBB (wt %) represent an ethylene content and a butene-1 content of the component B, respectively, and CAE (wt %) and CAB (wt %) represent an ethylene content and a butene-1 content of the component A, respectively.

2. The propylene block copolymer according to claim 1, wherein the intrinsic viscosity of the component B[η]B is 2.5 to 4.0 dl/g and the [η]B/[η]A is 0.8 to 1.5.

3. The propylene block copolymer according to claim 1, wherein the content of the xylene soluble portion at 20° C. having a molecular weight of 26000 or less is 6 wt % or less based on the propylene block copolymer.

4. The propylene block copolymer according to claim 3, wherein the content of the xylene soluble portion at 20° C. having a molecular weight of 26000 or less is 3.5 wt % or less based on the propylene block copolymer.

* * * * *